(12) United States Patent
McClellen et al.

(10) Patent No.: US 8,424,043 B1
(45) Date of Patent: Apr. 16, 2013

(54) METHOD AND SYSTEM FOR DETECTING UNSCHEDULED EVENTS AND RECORDING PROGRAMMING STREAMS

(75) Inventors: Christopher R. McClellen, Acworth, GA (US); Thomas Pratt, Atlanta, GA (US); Vernon Meadows, Lilburn, GA (US); Andrew Drooker, Atlanta, GA (US); Charles A. Eldering, Furlong, PA (US); Robert P. Ziemian, Jamison, PA (US)

(73) Assignee: Strategic Design Federation W, Inc.

( * ) Notice: Subject to any disclaimer, the term of this patent is extended or adjusted under 35 U.S.C. 154(b) by 470 days.

(21) Appl. No.: 11/876,815

(22) Filed: Oct. 23, 2007

(51) Int. Cl.
*H04N 5/445* (2011.01)

(52) U.S. Cl.
USPC .................................. 725/61; 725/40; 725/45

(58) Field of Classification Search .................. 725/136, 725/134, 38, 40, 45, 61; 707/3
See application file for complete search history.

(56) References Cited

U.S. PATENT DOCUMENTS

| | | | |
|---|---|---|---|
| 5,481,296 A | | 1/1996 | Cragun et al. |
| 5,758,076 A | | 5/1998 | Wu et al. |
| 5,822,123 A | * | 10/1998 | Davis et al. ...................... 725/43 |
| 5,991,799 A | * | 11/1999 | Yen et al. ....................... 709/218 |
| 6,061,056 A | * | 5/2000 | Menard et al. ................. 715/704 |
| 6,363,373 B1 | * | 3/2002 | Steinkraus ......................... 707/3 |
| 2003/0050062 A1 | | 3/2003 | Chen et al. |
| 2003/0093789 A1 | * | 5/2003 | Zimmerman et al. .......... 725/34 |
| 2003/0093790 A1 | | 5/2003 | Logan et al. |
| 2003/0097657 A1 | | 5/2003 | Zhou et al. |
| 2003/0105794 A1 | * | 6/2003 | Jasinschi et al. ................... 709/1 |
| 2003/0229900 A1 | | 12/2003 | Reisman |
| 2004/0043724 A1 | | 3/2004 | Weast |
| 2004/0117831 A1 | | 6/2004 | Ellis et al. |
| 2005/0188412 A1 | * | 8/2005 | Dacosta ......................... 725/110 |
| 2005/0278175 A1 | | 12/2005 | Hyvonen |
| 2007/0060099 A1 | * | 3/2007 | Ramer et al. .................. 455/405 |
| 2007/0214488 A1 | * | 9/2007 | Nguyen et al. ................ 725/134 |
| 2008/0168503 A1 | * | 7/2008 | Sparrell .......................... 725/58 |

* cited by examiner

*Primary Examiner* — Kristine Kincaid
*Assistant Examiner* — Sumaiya A Chowdhury
(74) *Attorney, Agent, or Firm* — The Belles Group, P.C.

(57) ABSTRACT

A method of triggering the recording of a programming stream includes: receiving a request to monitor for an unscheduled event; determining search strings associated with the unscheduled event; monitoring a programming stream; analyzing closed captioning information contained in the programming stream to determine the occurrence of the search strings; and recording the programming stream upon the occurrence of the search strings.

16 Claims, 16 Drawing Sheets

US 8,424,043 B1

METHOD AND SYSTEM FOR DETECTING UNSCHEDULED EVENTS AND RECORDING PROGRAMMING STREAMS

CROSS REFERENCE TO RELATED APPLICATIONS

This application is related to co-pending U.S. patent application Ser. No. 11/876,322, filed Oct. 22, 2007, entitled Method and System for Detecting Unscheduled Events and Recording Programming Streams; and U.S. patent application Ser. No. 11/877,701, filed Oct. 24, 2007, entitled Method and System for Detecting Unscheduled Events and Recording Programming Streams, the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings:

FIGS. 2B-7 are activity diagrams corresponding to unscheduled event detection and stream recording;

DETAILED DESCRIPTION

Figure 1:
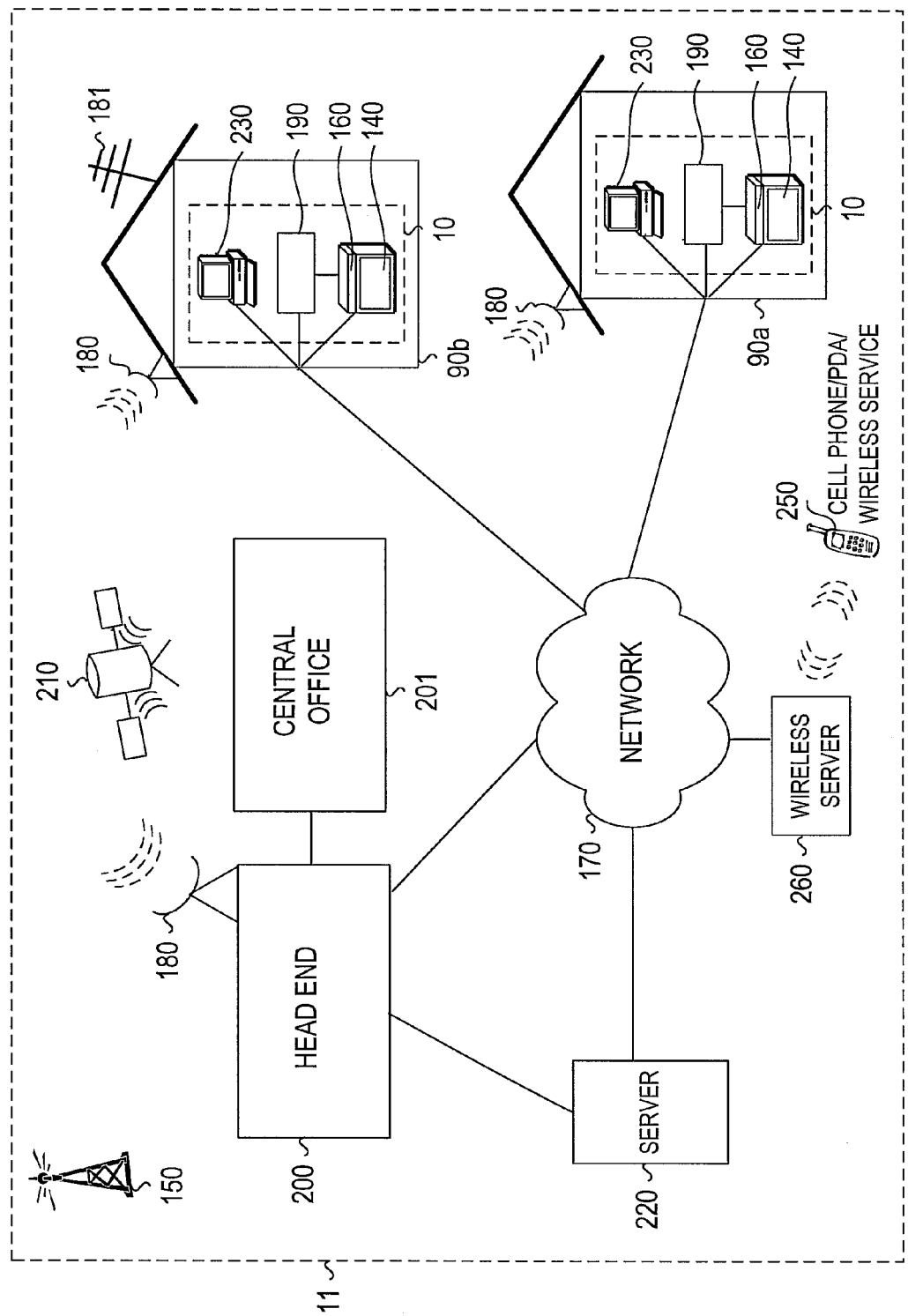
FIG. 1 is a diagram of the Unscheduled Event Detector and Stream Recorder, according to one embodiment of the present invention.

Certain terminology is used herein for convenience only and is not to be taken as a limitation on the embodiments of the present invention. In the drawings, the same reference letters are employed for designating the same elements throughout the several figures.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

Referring to the drawings in detail, wherein like numerals indicate like elements throughout, there is shown in FIG. 1 one embodiment of an Unscheduled Event Detector and Stream Recorder, generally designated 10, for detecting unscheduled events and recording programming streams in accordance with the present invention.

The term unscheduled event generally refers to an event or occurrence which may not be predicted according to a schedule, and may or may not be certain to occur in the future at all. Examples of unscheduled events that may be monitored by the Unscheduled Event Detector and Stream Recorder 10 include, but are not limited to: weather events (e.g., whenever the temperature drops below 10 degrees F.), weather forecasts (e.g., when a hurricane is forecast), stock quotes (e.g., when the DOW rises above 14,000), business news (e.g., when Microsoft announces a merger), sports news (e.g., when the Cubs win the World Series), other news (e.g., politics, entertainment, etc.), traffic reports (e.g., when there is a tractor trailer turn over on I-95), etc.

In one embodiment, the programming streams monitored by Unscheduled Event Detector and Stream Recorder 10 are television broadcast streams, which include audio, visual, and/or textual components, as well as supplemental data. In alternative embodiments, the programming streams may be audio only, video only, textual only, or any combination thereof. Examples of possible programming streams include, but are not limited to: broadcast television, satellite television, cable television, fiber optic, broadcast radio, satellite radio, internet, webcasts of the audio and/or video variety, or programming broadcast to mobile devices, such as cell phones and personal digital assistants (PDAs).

Referring to FIG. 1, the equipment and network associated with the Unscheduled Event Detector and Stream Recorder 10 are generally shown. The Unscheduled Event Detector and Stream Recorder 10 is generally implemented on user equipment that may include a display device 140, set top box (STB) 160, a recording device 190, and any combination thereof. User equipment may also include a computer 230, or alternatively may only be computer 230. STB 160 may be a stand-alone unit or incorporated into the display device 140. Alternatives for user equipment include, portable devices such as laptops, cell phones, PDAs, and other devices configured to receive transmissions and process and display video, audio, and/or text.

STB 160 is configured to receive and process programming streams and cause them to be displayed on a display device 140. Unscheduled Event Detector and Stream Recorder 10 may be configured to receive programming streams from a variety of sources including, but not limited to: a network 170 (e.g., internet, cable, fiber optic, digital subscriber line, or any other broadband means of transmission), satellite dish 180, or over-the-air broadcasts. Network 170 is connected to a headend 200 and central office 201, which sends programming streams to Unscheduled Event Detector and Stream Recorder 10. Programming streams may also be received via antenna 181 from broadcast antenna 150. If portable devices are used, such as a cell phone, a wireless network is used to deliver programming streams. Unscheduled Event Detector and Stream Recorder 10 includes a processing system for decoding the programming streams. The processing system located in Unscheduled Event Detector and Stream Recorder 10 contains software and/or hardware which receives requests to monitor for unscheduled events, monitors programming streams for the occurrence of an unscheduled event, and activates the recording of a programming stream at a recording device 190. Alternatively, the programming streams may be recorded on computer 230 or any other suitable storage device. Further, STB 160, may be configured to run applications such as an Electronic Programming Guide (EPG), an On Demand video system, and other applications that will be apparent to those skilled in the art.

Recording device 190 is a device capable of recording and replaying programming streams. Recording device 190 may be a VCR, DVD-recorder/player, CD-recorder/player, personal video recorder (PVR), digital video recorder (DVR), a hard drive type storage unit, solid state storage, or any other unit capable of data storage. Recording device 190 is connected to display device 140 and STB 160. Alternatively, recording device 190 may be integrated into display device 140 or STB 160.

Figure 2A:
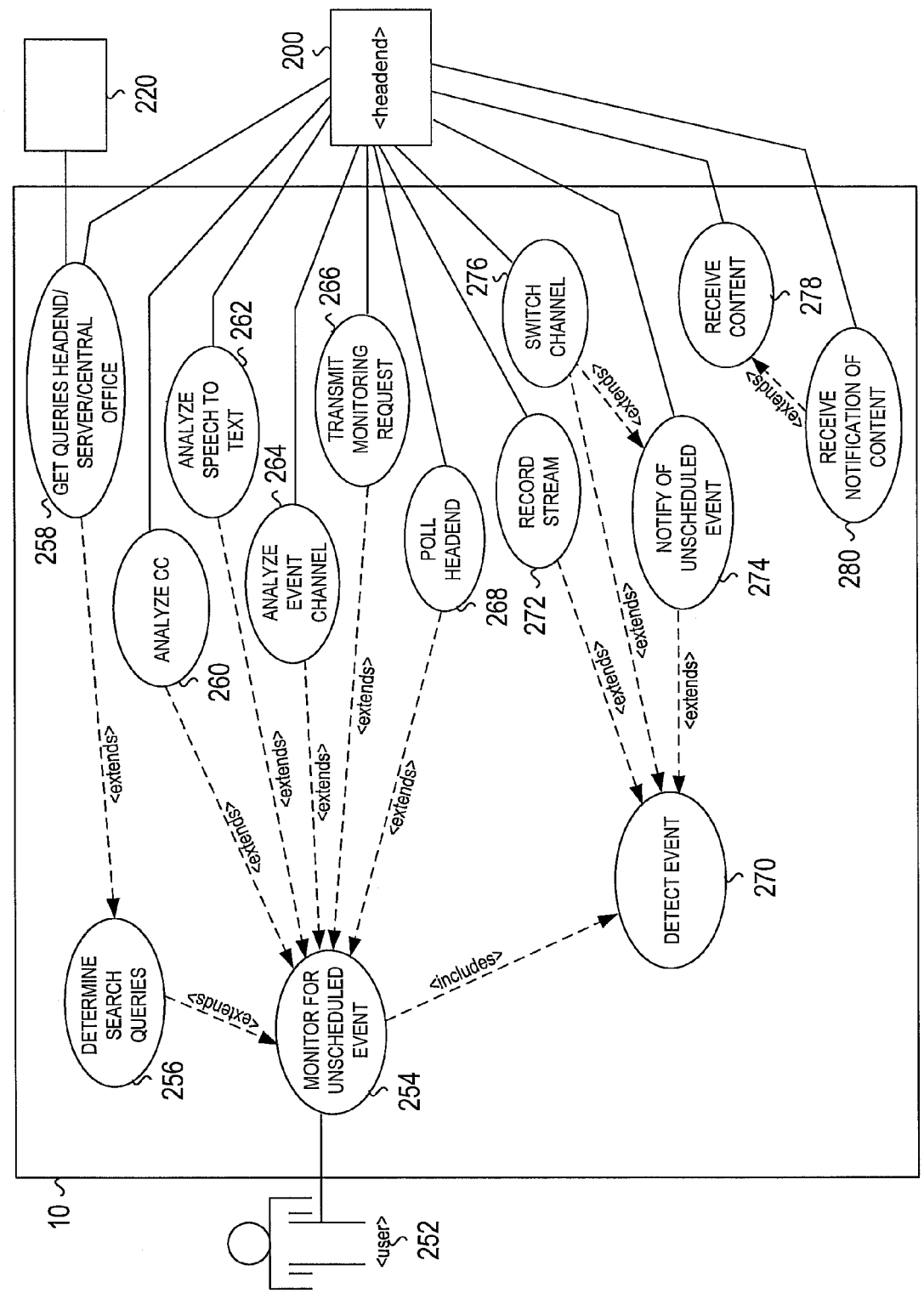
FIG. 2A is a use case diagram corresponding to unscheduled event detection and stream recording.

As shown in FIG. 2A, a user 252 may request that the Unscheduled Event Detector and Stream Recorder 10 monitor for an unscheduled event in the Monitor for Unscheduled Event use case 254. Monitor for Unscheduled Event 254 monitors a data source for the occurrence of an unscheduled event. Numerous alternative data sources may be monitored for unscheduled events, which are described in greater detail below. Monitor for Unscheduled Event use case 254 may function according to a variety of techniques. For example, the user may enter search queries, for which a data stream may be monitored. Alternatively, the user may access a menu driven system to indicate what unscheduled event she wishes to monitor for.

As shown in FIG. 2A, Determine Search Queries use case 256 may extend the capabilities of Monitor for Unscheduled Event use case 254. In response to the user entering an unscheduled event that she is interested in monitoring for, it is determined how to monitor for that event. One way involves developing search queries for the desired unscheduled event. The Determine Search Queries use case 256 takes the desired unscheduled event and develops words or phrases related to the unscheduled event. This may be accomplished using a database storing unscheduled events and related search terms. Alternatively, the transmitted codes may indicate the occurrence of an unscheduled event. In yet another embodiment, images may be analyzed for patterns, colors, or other dynamically or predetermined information to detect the occurrence of unscheduled events. Additional description of the determination of queries can be found below in relation to FIGS. 2B-8.

The Get Queries use case 258 may extend the capabilities of the Determine Search Queries use case 256 by allowing Unscheduled Event Detector and Stream Recorder 10 to request queries from the headend 200. Alternatively, Get Queries use case 258 may request queries from a remote server 220. In some embodiments, a database at headend 200 (or alternatively at a remote server 220) may have a more extensive and frequently updated database of search terms, and therefore this use case may be desirable. Additional description of the requesting of queries from the headend/central office/servers can be found below in relation to FIG. 4.

In order to monitor for unscheduled events, the Unscheduled Event Detector and Stream Recorder 10 receives a data source(s) to monitor or send a request to the headend 200 or a server 220 for the monitoring of a data source(s). The Analyze CC (closed captioning) use case 260 may extend the capabilities of the Monitor for Unscheduled Event use case 254 by providing closed captioning information for the Unscheduled Event Detector and Stream Recorder 10 to monitor. The Analyze CC use case 260 receives a programming stream or streams from the headend 200. Closed Captioning information from the received programming stream (s) is then monitored by the Unscheduled Event Detector and Stream Recorder 10. Queries developed in the previously described Determine Search Queries use case 256 may be monitored for in the closed captioning stream provided. Additional description of the determination of queries can be found below in relation to FIGS. 2B-7.

The Analyze Speech to Text use case 262 may extend the capabilities of the Monitor for Unscheduled Event use case 254 by converting audio in the form of speech to text. Audio in the form of speech may be received from the headend 200 as part of a programming stream. Alternatively, the audio may be received from a server, radio frequency transmission, or other data source. The data stream produced by this conversion is then monitored by the Unscheduled Event Detector and Stream Recorder 10. Additional descriptions of analyzing speech to text can be found below in relation to FIGS. 2B-7.

The Analyze Event Channel use case 264 may extend the capabilities of the Monitor for Unscheduled Event use case 254 by enabling the monitoring of a data stream containing information about the occurrence of unscheduled events. The event channel may be received from the headend 200 or other data stream provider, such as server 220 or remote computer. By monitoring the Event Channel, unscheduled events may be detected. Additional description of the analyzing of an event channel can be found below in relation to FIG. 7.

In one embodiment, the event channel contains closed captioning information related to all available programming streams. The closed captioning information may be the aggregate of all closed captioning appearing on all stations. Alternatively, the closed captioning information may be a summary of the closed captioning information. This summary can be created by eliminating words in the closed captioning that are common place and only retaining unique words that are likely to trigger the detection of an unscheduled event. For instance, words such as the common articles "the," "a," and "an" are unlikely to be associated with an unscheduled event query. Furthermore, most verbs are unlikely to be associated with an unscheduled event; for example, the verb "to be," "to go," "to say," etc. would also be unlikely to be related to an unscheduled event. In the sentence "It looks like the hurricane is going to make landfall in West Palm Beach on Monday morning at 9:00 am," many of the words may be unimportant to detecting an unscheduled event. For instance, the words "It looks like the" and "going to make" are unlikely to be associated with unscheduled events. Therefore, these words may be eliminated from the data carried in the unscheduled event channel and instead, only "hurricane landfall in West Palm Beach on Monday morning at 9:00 am" is transmitted.

Alternatively, the event channel may contain other event detection system triggers. For instance, commonly requested unscheduled events may have an event code associated with them. The occurrence of an event may be remotely determined either in an automated fashion or through human interaction and monitoring. Then, the event code may be added to the event channel. A constantly evolving table of codes may be maintained at the Unscheduled Event Detector and Stream Recorder and at the source of the event channel. This table may be periodically updated or dynamically updated when changes occur.

Poll Headend use case 268 may extend the capabilities of the Monitor for Unscheduled Event use case 254 by enabling the Unscheduled Event Detector and Stream Recorder 10 to poll the headend 200 or remote server 220 for the occurrence of an unscheduled event.

Transmit Monitoring Request use case 266 may extend the capabilities of the Monitor for Unscheduled Event use case 254 by enabling the Unscheduled Event Detector and Stream Recorder 10 to send a request to the headend 200 to monitor for an unscheduled event. In this case, the headend 200 acts as the unscheduled event detector. The processes at the headend 200 may be the same or similar to the processes described in relation to the Unscheduled Event Detector and Stream Recorder 10. In this way, the user equipment implementing the Unscheduled Event Detector and Stream Recorder 10 and the headend 200 may work together and may be referred to as an Unscheduled Event Detector System 11 (See FIG. 1). More detail concerning the Unscheduled Event Detector System 11 may be found in FIGS. 4-6 and in the corresponding text below.

The headend 200 may process requests from multiple users and may combine similar queries so that the system does not perform redundant monitoring. Upon detecting an unscheduled event, the headend 200 may send notification to the user equipment, record the appropriate programming stream for later delivery, or take other action as described below.

The Monitor for Unscheduled Event use case 254 includes the Detect Event use case 270. The Detect Event use case 270 may enable a variety of different actions in response to the detecting of an unscheduled event. For example, the Record Stream use case 272 may extend the capabilities of the Detect Event use case 270 by enabling the Unscheduled Event Detector and Stream Recorder 10 to record a programming stream corresponding to unscheduled event. Unscheduled Event Detector and Stream Recorder 10 may itself have recording capabilities or it may activate a PVR, DVR, computer, or similar device. The headend 200 may also interact with the Record Stream use case 272, both by providing the programming stream for recording and/or triggering the recording when an event is detected at the headend 200 in relation to the embodiment described in FIG. 5.

The Notify of Unscheduled Event use case 274 may extend the capabilities of the Detect Event use case 270 by enabling the Unscheduled Event Detector and Stream Recorder 10 to notify the user of the occurrence of an unscheduled event. The Switch Channel use case 276 may further extend the Notify of Unscheduled Event use case 274 or may extend the Detect Event use case 270. In this way, when an unscheduled event is detected, the Unscheduled Event Detector and Stream Recorder 10 may automatically change the station through the Switch Channel use case 276, or notify the user and offer to switch the channel, or simply notify the user of the occurrence.

As previously discussed, in the Transmit Monitoring Request use case 266, the Unscheduled Event Detector and Stream Recorder 10 may send a request to the headend 200 to monitor for events. When an event is detected, the headend 200 may interact with the Record Stream use case 272 and cause the Unscheduled Event Detector and Stream Recorder 10 to record a programming stream. Further, the headend 200 may interact with the switch channel use case 276 and cause the channel to switch or interact with the Notify of Unscheduled Event use case 274 and cause a notification to occur. In one embodiment, described in relation to FIG. 6, the headend 200 may record the programming stream. The headend 200 may then activate the Receive Content use case 278 and send the content to the Unscheduled Event Detector and Stream Recorder 10. This can occur via an On Demand system or similar system. The headend 200 may also send a notification to the Unscheduled Event Detector and Stream Recorder 10 that will be presented to the user, indicating that a stream has been recorded via the Receive Notification of Content use case 280. The Receive Content use case 278 may extend the usage of the Receive Notification of Content use case 280 by enabling the user 252 to recieve the delivery of the content upon receiving the notification.

The Unscheduled Event Detector and Stream Recorder 10 may detect unscheduled events according to one scheme, such as the Analyze CC use case 260, or may incorporate multiple schemes of detecting events. Similarly, multiple searching techniques may be used concurrently. Multiple actions may also be taken in response to the detection of an unscheduled event.

Figure 2B:
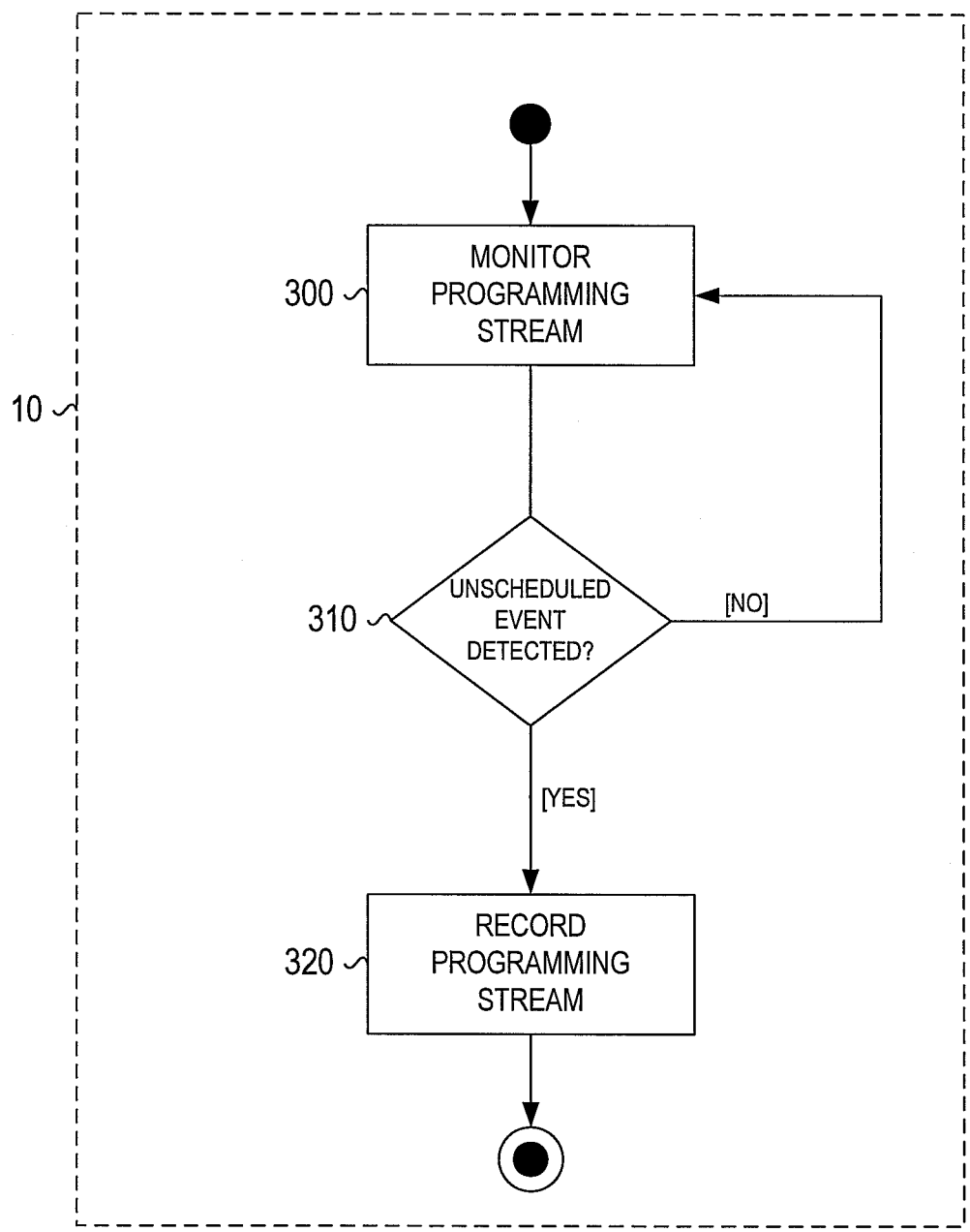

As shown in FIG. 2B, Unscheduled Event Detector and Stream Recorder 10 monitors an incoming programming stream in activity 300. At decision point 310, if no unscheduled event is detected, the flow returns to monitoring the programming stream at activity 300. If an unscheduled event is detected, then Unscheduled Event Detector and Stream Recorder 10 decodes and records the programming stream in which the unscheduled event was detected in activity 320.

The monitoring of an incoming programming stream in activity 300 may occur according to many different schemes and may be implemented on a variety of different systems. In one embodiment, depicted in FIG. 3, the system receives a request to monitor for an unscheduled event in activity 350. This request may be input by a user in a variety of ways that will be readily apparent to those skilled in the art. One such way is to use an input device to enter information into an Electronic Programming Guide (EPG).

An EPG can be implemented on display device 140, STB 160, and/or recording device 190, and may be controlled using the STB or a remote control as an input device. Alternatively, the EPG may be implemented on different systems which include a processor and memory, such as a computer 230. Other devices may be used to control the EPG, such as a voice recognition system, keyboard, mouse, remote access device, or any other system that may send commands either directly or via a communications network.

The request to monitor for an unscheduled event can be entered via a menu driven system of the EPG. The user selects the programming stream she wishes the system to monitor from a menu. Alternatively, the user enters the channel identification code in response to an appropriate prompt. The channel identification code may be a channel number, call letters, symbol, webcast stream address, other network identification code, or some combination thereof. In the case of traditional television systems, the user enters the channel number or the network name/call letters.

In one embodiment the user may indicate that he wishes all available channels monitored for an unscheduled event. The ability of the system to monitor multiple channels/webcasts/ programming streams may depend on the locus of the monitoring of programming streams. Possible loci for monitoring programming streams are described below.

Additionally, the user inputs information sufficient to determine the occurrence of an unscheduled event. The user is presented with a variety of menu options by the EPG. These menu options include categories of events, e.g., stocks, business, sports, news, weather, traffic, entertainment, etc. Each menu categories contains numerous sub-categories so that the user may refine her selection to indicate the types of programs to monitor for the unscheduled event of interest. A menu driven system may have limits to what types of unscheduled event may be indicated because the menus may have to be pre-designated (however, some systems may include an "intuitive" menu determining system, which generates menus as needed in order to allow the user to input the desired unscheduled event).

For example, the user may want to record the MSNBC program stream whenever a certain company or ticker symbol is mentioned. In this case, the user would select MSNBC as the programming stream and then select the company of interest to the user. The company may be selected from a pre-designated menu of commonly mentioned companies. For instance, the user may select the mentioning of Microsoft on MSNBC to be the unscheduled event.

Alternatively, the user enters text queries. The user may indicate interest in a particular keyword(s), phrase, or particular occurrence described in words.

Figure 3:
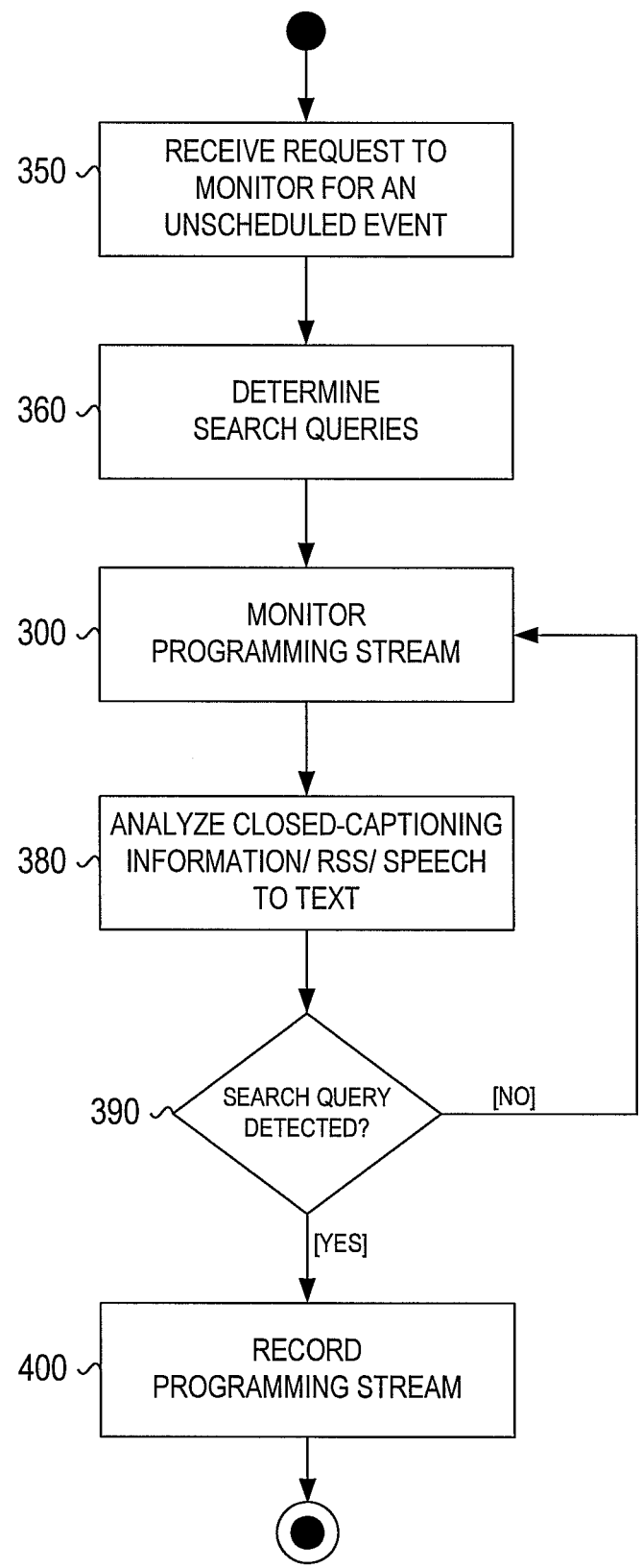

Still referring to FIG. 3, the user inputs the desired unscheduled event and Unscheduled Event Detector and Stream Recorder 10 receives the request in activity 350. In activity 360, Unscheduled Event Detector and Stream Recorder 10 determines the search queries for programming stream(s) that are monitored. Each possible menu request to monitor for unscheduled events has search queries associated with it. The search queries may be stored in a lookup table or dynamically generated upon the selection of a request from the menu. The search queries may be developed in Structured Query Language (SQL). In one alternative, the user is given access directed to the queries developed based on her request and may directly modify the queries.

Alternatively, the user may bypass the menu system and generate a SQL or database query. In another alternative, the user enters a request in a natural human language and the request is processed using a natural language processor to determine appropriate search queries.

Continuing with the above example, in the case of interest in the company Microsoft, developed search queries would include "Microsoft," "MSFT" (the stock ticker symbol), "Windows Vista," "Windows Is Computer," etc. A number of advanced schemes are available for determining search queries and will be discussed below in relation to alternative embodiments.

Figure 14:
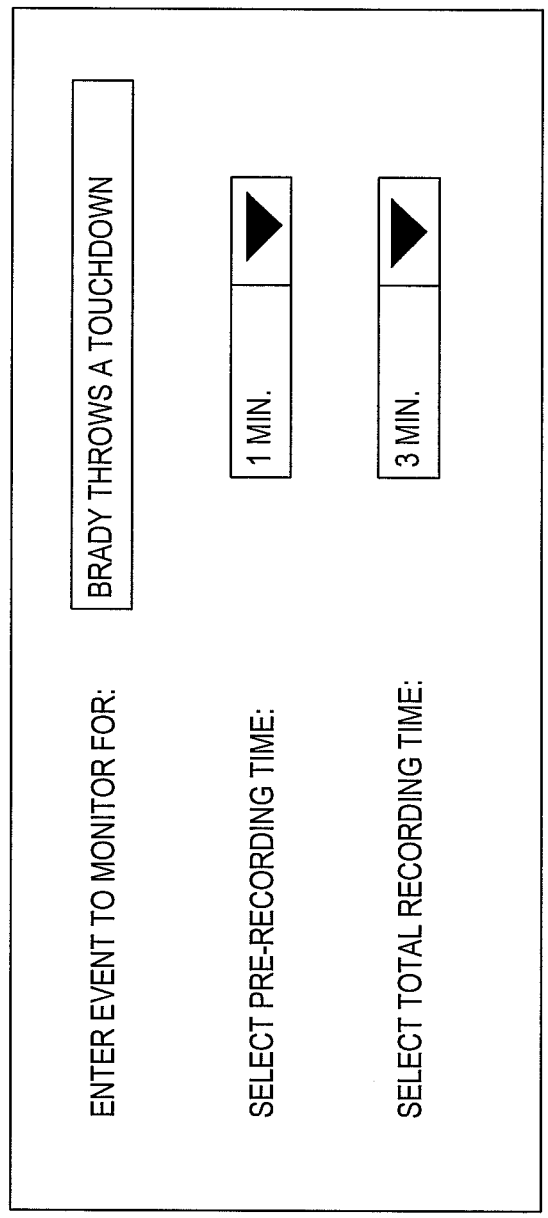
FIGS. 14-17 depict user interfaces for entering requests to monitor for unscheduled events.

In FIGS. 14-17, examples of user interfaces are shown. Referring to FIG. 14, the user may enter an event she wishes to monitor for, such as Tom Brady throwing a touchdown pass. The user may select the time of recording she desires prior to the occurrence of the event and the total recording time she desires. This interface relies on the user entering search terms.

Figure 15:
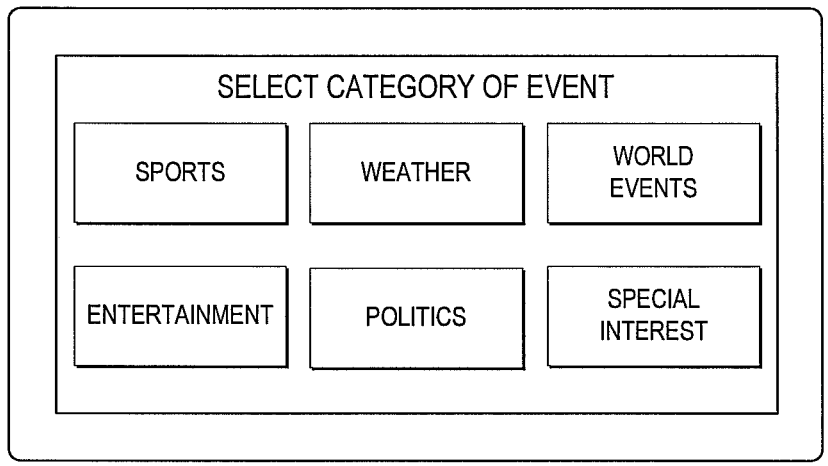
Figure 16:
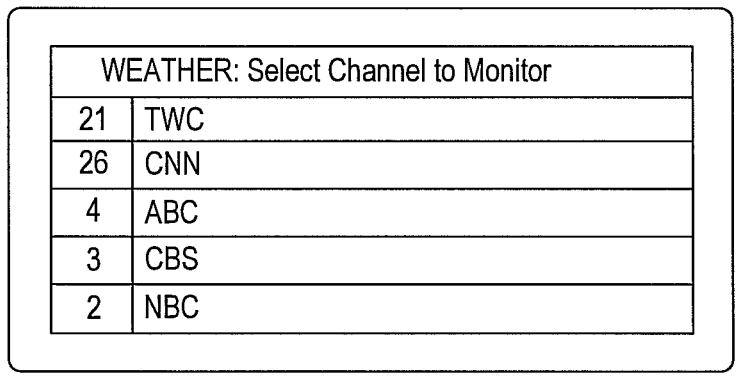
Figure 17:
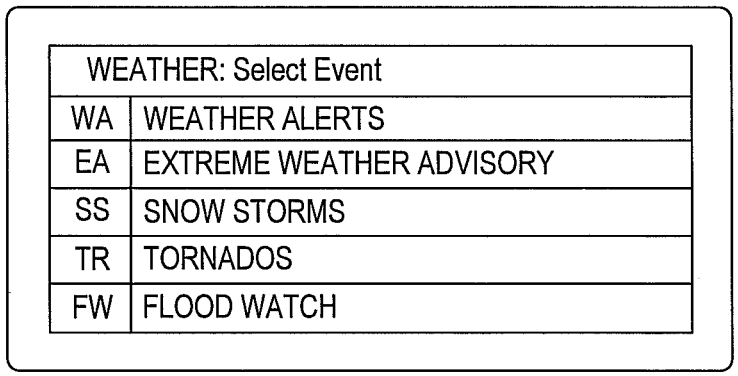

In FIGS. 15-17, a menu driven interface is depicted. Referring to FIG. 15, the user chooses the category of event for which she wishes to monitor. Referring to FIG. 16, the user then chooses the station(s) to monitor. Referring to FIG. 17, the user chooses from a variety of preset weather events to monitor for, such as flood watches and tornados. A combination of the interfaces described in relation to FIGS. 14-17 is possible, as are many other event entry interfaces.

Still Referring to FIG. 3 and activity 300, Unscheduled Event Detector and Stream Recorder 10 monitors the programming stream. Unscheduled Event Detector and Stream Recorder 10 retrieves closed captioning information from the programming stream and temporarily stores the closed captioning information to be analyzed in activity 380.

The Unscheduled Event Detector and Stream Recorder 10 retrieves closed caption information from the appropriate location. The closed captioning information is carried in different places depending on the programming format. For NTSC programming, closed captioning information is carried in line 21 of the vertical blanking interval of the programming stream for standard television broadcasts. For MPEG video format, closed captioning information is carried in three streams encoded in the video for ATSC digital television. For ATSC (digital television) programming, three streams are encoded in the video: two are backward compatible Line 21 captions, and the third is a set of up to 63 additional caption streams encoded in EIA-708 format.

In activity 380, the monitored closed captioning information is analyzed by Unscheduled Event Detector and Stream Recorder 10. The closed captioning information is analyzed for the search queries developed in activity 360. If a match is found at decision point 390, Unscheduled Event Detector and Stream Recorder 10 records the programming stream in activity 400. The programming stream is recorded on recording device 190 or alternatively on another piece of user equipment as described above.

Unscheduled Event Detector and Stream Recorder 10 records the programming stream for a set period of time after the detection of the unscheduled event. Alternatively, monitoring for unscheduled events continues and each time search strings are detected a new recording begins. In another embodiment, the recording of the programming stream continues until a commercial break occurs in the programming stream.

In one embodiment, Unscheduled Event Detector and Stream Recorder 10 buffers the programming stream so that when an unscheduled event is detected, it can capture content preceding the detected event, as well as the content that follows. The buffer time can be a default or may be set by the user so that the desired amount of the programming stream is captured before, during, and after the occurrence of the unscheduled event.

Figure 4:
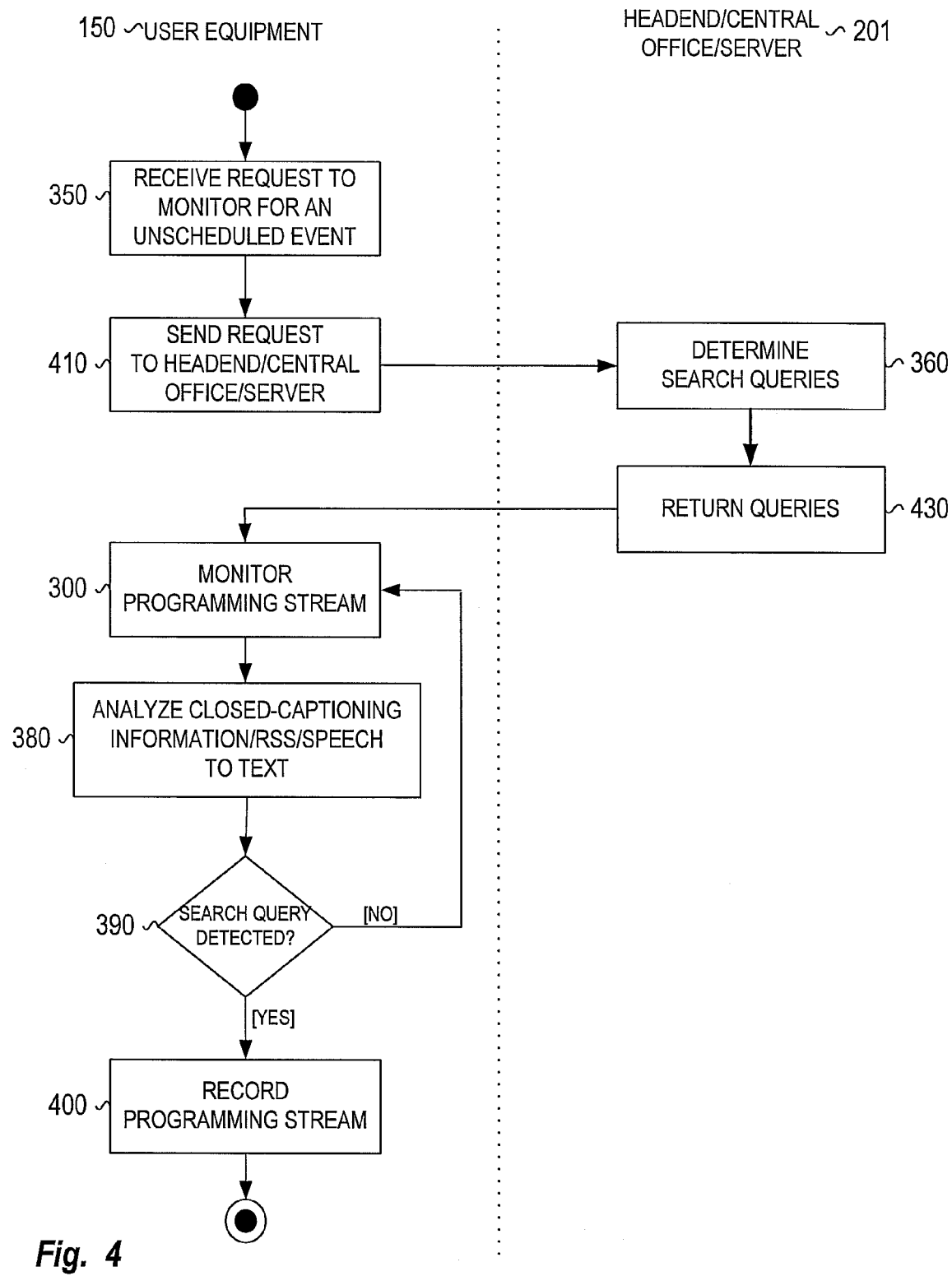

Referring to FIG. 4, in alternative embodiment of Unscheduled Event Detector and Stream Recorder 10. Activities 350, 360, 300, 380, 390 and 400 in FIG. 4, function in a similar manner as previously described. However, in this embodiment, instead of Unscheduled Event Detector and Stream Recorder 10 locally calculating search queries, upon receiving a request to monitor for unscheduled events in activity 350, Unscheduled Event Detector and Stream Recorder 10 sends a request to headend 200 at activity 410. Alternatively, user equipment may send the request in activity 350 to any server 220 or processor capable of receiving and processing requests.

In activity 360, search queries are determined. Activity 360 functions in essentially the same way as previously described, except that it occurs at headend 200 or server 220. Alternatively, activity 360 may include advanced processing techniques and unified search query generation for a plurality of users requesting to receive a query for the same or similar unscheduled event. Advanced processing power and features may be available at headend 200 or server 220 as compared to at Unscheduled Event Detector and Stream Recorder 10.

Figure 5:
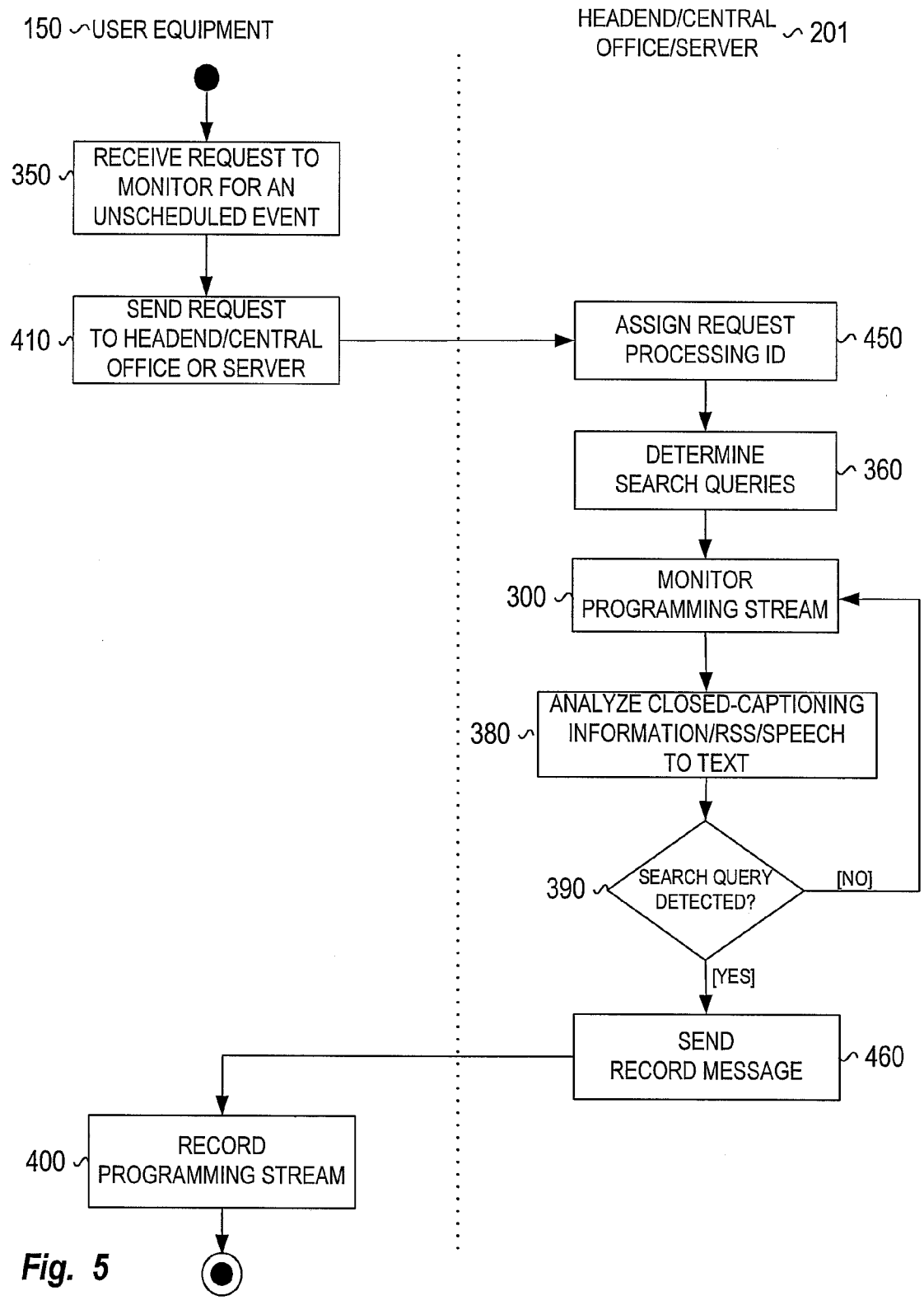
Figure 6:
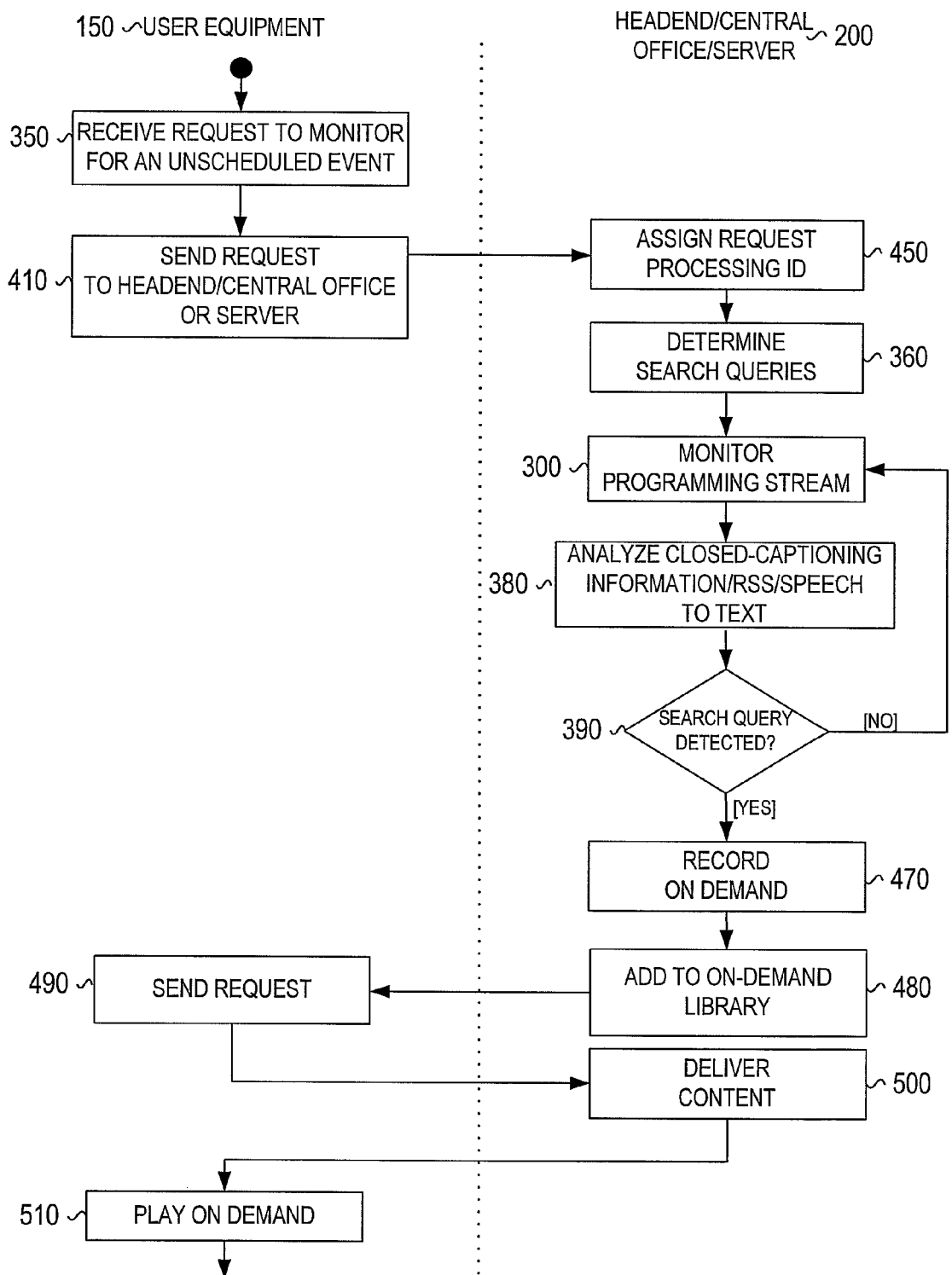

In any of the embodiments described herein, search queries may be developed in a distributed computing manner. An N-tier architecture system may be developed, wherein headend 200 functions as the logic tier, Unscheduled Event Detector and Stream Recorder 10 functions as the presentation tier, and a server 220 accessible by headend 200 either locally or over a network functions as the data tier. Alternatively, the system may be designed in as a Model-View-Controller (MVC) system, which might function under the paradigms depicted in FIGS. 4, 5, and 6. Such a system would potentially separate a locally functioning user interface operation from intensive data processing, which could occur remotely at the headend. As depicted in FIGS. 4, 5, and 6, a portion of the intensive data processing takes place at the headend, for instance, the determination of queries, the monitoring for the occurrence queries, and the recording of queries.

With reference to FIG. 4, regardless of what system is implemented, search queries are returned to Unscheduled Event Detector and Stream Recorder 10 in activity 430 and then the programming stream is monitored in activity 300. Activities 380, 390, and 400 function essentially as previously described.

Referring to FIG. 5, as in FIG. 4, in activity 350 Unscheduled Event Detector and Stream Recorder 10 receives a request from a user to monitor for an unscheduled event. The request is sent from the Unscheduled Event Detector and Stream Recorder 10, to headend 200 in activity 410. The combination of the headend 200 and Unscheduled Event Detector and Stream Recorder 10 may be referred to Unscheduled Event Detection System 11.

Upon receiving the request at headend 200 or server 220, a processing identifier to the request is assigned in activity 450. As previously described, the headend 200, performs the function previously described in relation to the Unscheduled Event Detector and Stream Recorder 10, and determines search queries in activity 360, monitors the programming stream in activity 300, analyzes the closed captioning information in activity 380, until an unscheduled event is detected. Upon the detection of an unscheduled event at activity 390, a message is sent to Unscheduled Event Detector and Stream Recorder 10 at activity 460. This message causes Unscheduled Event Detector and Stream Recorder 10 to record the programming stream on which the unscheduled event occurred. Therefore, Unscheduled Event Detection System 11 functions in a similar way to above described embodiments of the Unscheduled Event Detector and Stream Recorder 10, with the exception that the resources are distributed.

In FIG. 6, the programming streams associated with unscheduled events are not initially stored at Unscheduled Event Detector and Stream Recorder 10. In contrast to the previous embodiments, recorded programming streams are stored at headend 200 or other location (such as server 220) which can deliver the recorded programming streams upon request. Instead of storing each user's programming stream portions corresponding to unscheduled events locally, they are stored remotely at headend 200 (or alternative at a network accessible device, such as server 220). Upon request, the programming streams are transmitted to Unscheduled Event Detector and Stream Recorder 10 at which time they may be stored locally if the user desires. This may reduce redundancy in the system. Furthermore, the system may be configured to allow users to retrieve programming streams stored in relation to other unscheduled events not initially requested by the user, even after the unscheduled event has occurred, by accessing the stored streams requested by other users.

Activities 350, 410, and 450 function essentially the same as previously described with respect to FIG. 5. After the request is received at headend 200 or server 220, a processing identifier is assigned to the request 450 in order to track it in the system. Activities 360, 300, 380, and 390 essentially function as previously described in relation to FIG. 5, except that they take place at headend 200 or server 220. When an unscheduled event is determined to have occurred in activity 390, the processing system at headend 200 or server 220 records the programming stream for use with an On Demand system in activity 470. An On Demand system will be understood by those skilled in the art. In activity 480, Unscheduled Event Detection System 11 adds the recorded programming stream to the user's library of available On Demand selections.

In activity 460, when the user is ready to view the content, Unscheduled Event Detector and Stream Recorder 10 sends a request to headend 200 or server 220 for the content to be delivered for viewing. Headend 200 or server 220 delivers the content over network 170 to Unscheduled Event Detector and Stream Recorder 10 in activity 500. In activity 510, the recorded content is played. Optionally, the user may locally store the delivered content after it is delivered in activity 500. Although all of the described embodiments may be implemented to work on a wired network, in other embodiments, On Demand video is delivered to cell phones and other devices enabled to send and receive information over a wireless network. Therefore, FIG. 6 is also applicable to On Demand delivery systems for cell phones and other wireless devices.

Referring to FIG. 6, as previously stated, Unscheduled Event Detector and Stream Recorder 10 may be implemented on a cellular phone or other wireless devices. In this case, server 260 is substituted for/or used in conjunction with headend 200 and transmits information to cell phone 250 or other wireless devices over a cellular or wireless network.

Figure 12:
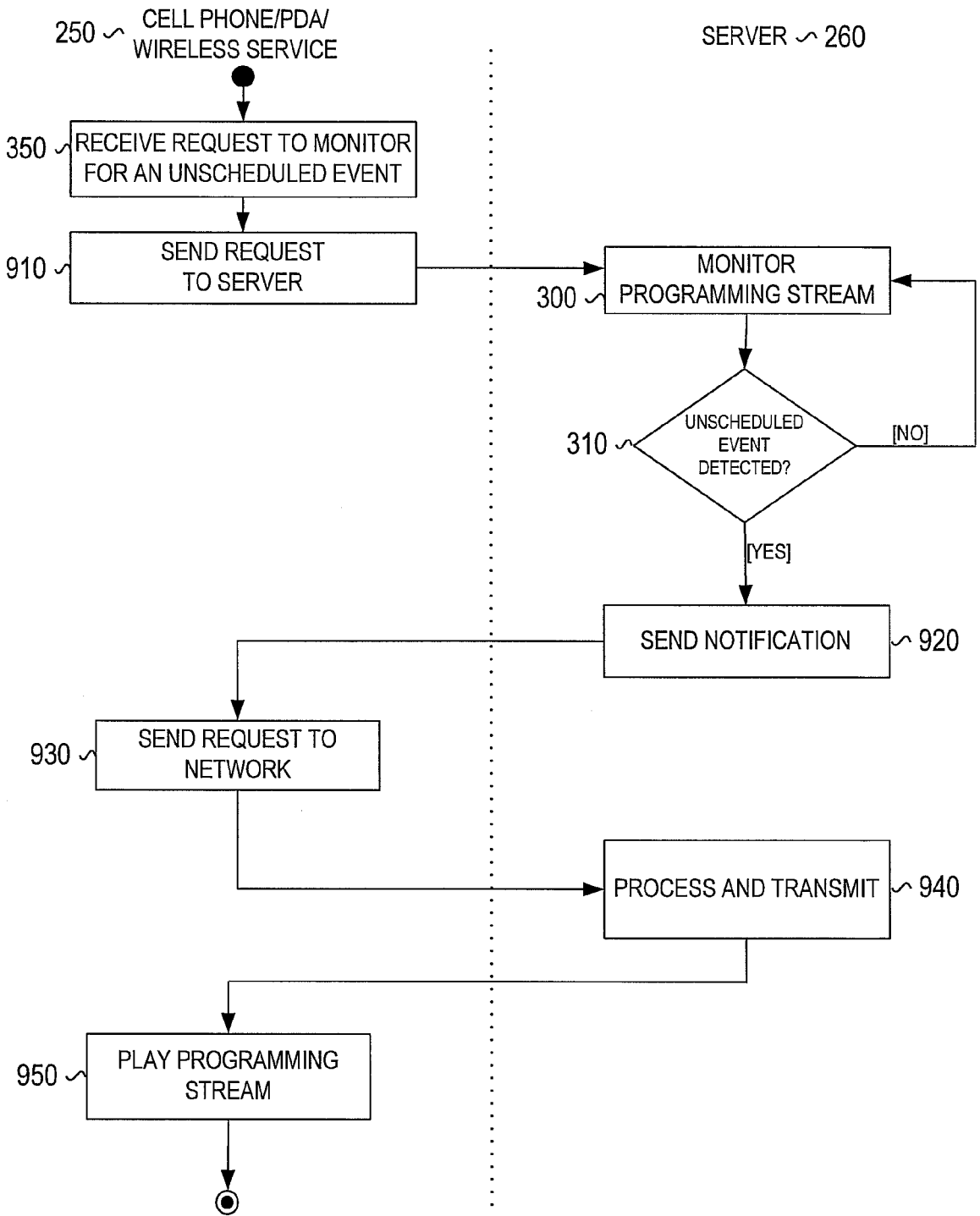
FIGS. 12 and 13 are activity diagrams corresponding to unscheduled event detection and programming stream delivery in a wireless network.
Figure 13:
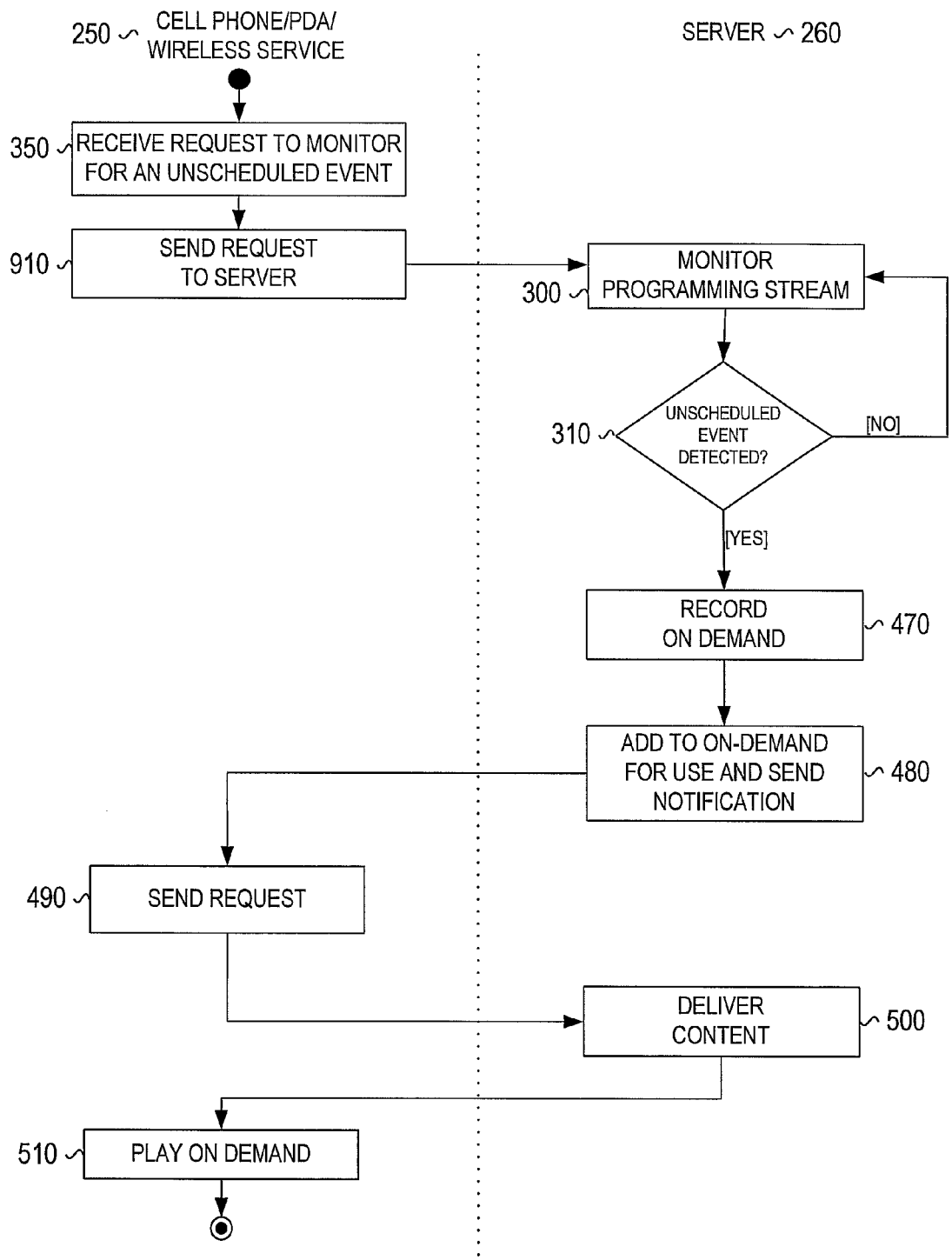

The cell phone user may send requests to monitor for unscheduled events and receive a notification when such event has occurred and content is accessible. For instance, the user may want to receive video when the Patriots are in the red zone. FIGS. 12 and 13 present ways that a cell phone based system may detect and deliver content. In one embodiment, sports fans are able to select from a predetermined list of events for a number of sports teams. For instance, NFL football teams may be included. Events for NFL teams may be scores, turnovers, when one team enters the red zone, injuries, two minute warning, etc.

In FIG. 12, real time or a close to real time broadcast of a programming stream are transmitted. In activity 350, the user will input a request to monitor for an unscheduled event, in this case when the Patriots are in the red zone. In activity 910, this request is sent to server 260. The server 260 (or group of servers) monitors for the occurrence of the unscheduled event.

In activity 300, the appropriate programming stream is monitored. In activity 310, if an unscheduled event in detected, a notification is sent to the user in 920. In this case, it is appropriate for the server 260 to monitor a programming stream, however as described above and below, the server 260 may instead monitor another server, RSS feed, unscheduled event stream, or other information source. The programming stream for monitoring may be determined via the available football television schedule. As above, monitoring the closed captioning information, is one viable methodology.

The notification sent to the user in step 920 may be in the form of a text message or other alert. The text message allows the user to immediately receive a streaming version of the broadcast. This is typically done by presenting a link or other active portion of the text message and allowing the user to select "goto." In activity 930, the user sends a request for the broadcast. In activity 940, the programming stream is processed and transmitted to the user and in activity 950 the stream is played on the user's cell phone. These activities are performed using a network that allows streaming content such as a unicast or multicast network. This is typically found in higher speed wireless 3G networks, for example, EV-DO (EVDO) networks.

Referring to FIG. 13, an alternative embodiment is shown, where instead of delivering content in real time or near real time, content is first recorded and then delivered. Since some networks do not support streaming content, content may first be recorded and then delivered. Activities 350, 910, 300, and 310 function as described above in relation to FIG. 12. Similar to FIG. 6, when an unscheduled event is detected, the system records the program for On Demand access in activity 470. The recorded portion of the programming stream is added to the user's On Demand library in activity 480. The user is sent a notification of this addition in activity 480. This notification may be in the form of a SMS (short message service) text message. The notification contains information concerning the clip that was recorded and the unscheduled event that it is related to. The user may send a request for the delivery of the clip in step 490. This may be accomplished through a command accessible through the text message (such as the "goto" command) or through menu driven access to a user's available on demand library. In activity 500, the content is delivered over the network and in step 510 the user may play the clip.

Figure 7:
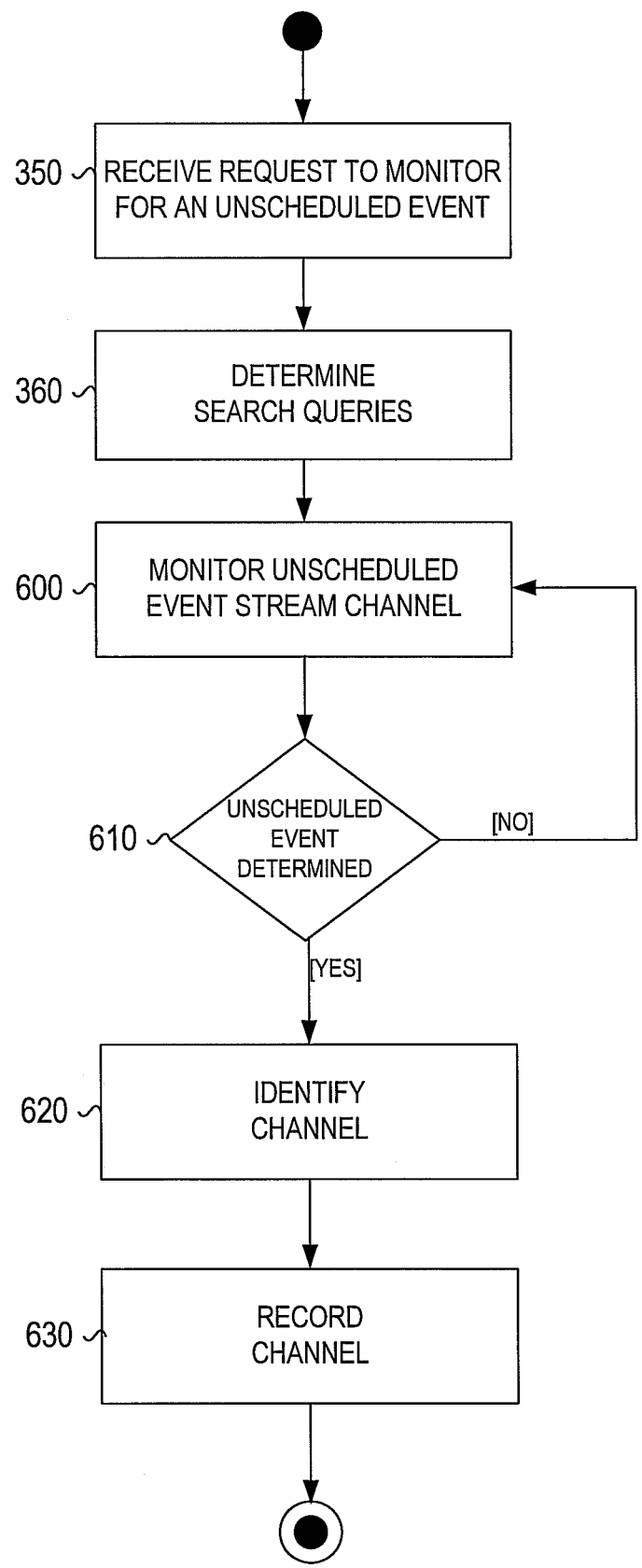

Referring to FIG. 7, an alternative embodiment incorporates the use of an unscheduled event stream channel. In this embodiment, data concerning unscheduled events is collected into a data stream that may be monitored for unscheduled events related to all available programming streams. The unscheduled event stream channel can be created according to a variety of techniques.

One technique involves aggregating closed captioning information from all available channels. This process may result in a very data intensive unscheduled event stream channel. Therefore, closed captioning information may be processed at headend 200 or at a server 220 to filter for keywords, such as proper nouns, terms that are statistically significant based on common language usage, preset terms, or terms based on parsing user requests. Furthermore, many popular news, information, and sports channels currently incorporate tickers which may be analyzed to determine unscheduled events, such as MSNBC, CNN, E!, ESPN, FOX News, etc. The raw data may be supplied by the providers, or the tickers may be captured and analyzed. Further, RSS feeds may be analyzed to build the unscheduled event stream channel or other feeds available via the Internet. The unscheduled event stream channel may include some or all of the above data sources.

The unscheduled event stream channel may be a separate programming channel, or may be included in existing programming channels, by encoding the information in a fashion that will not be displayed. Such techniques will be understood by those skilled in the art in relation to Vertical Blanking Intervals, MPEG2, and MPEG4.

The unscheduled event stream channel identifies which channel or channels each event is associated with. For example, if the unscheduled event is a natural disaster such as an earthquake, multiple channels may have coverage of this event, such as CNN, Fox News, MSNBC, local news stations, etc. The channels associated with an unscheduled event may be based on the actual detection of information in the associated programming stream or may be an estimate of what programming streams contain content based on the category of the unscheduled event. For instance, if the unscheduled event is Senator Edward Kennedy's death, then coverage will likely occur on stations such as CNN and not ESPN. Alternatively, the user may dictate which channel should be monitored for the recording of an unscheduled event.

With reference to FIG. 7 and activity 350, Unscheduled Event Detector and Stream Recorder 10 receives a request from a user to monitor for an unscheduled event. In activity 360, as described above, search queries are generated. In activity 600, Unscheduled Event Detector and Stream Recorder 10 monitors the unscheduled event stream channel. At decision point 610, if an event is detected, Unscheduled Event Detector and Stream Recorder 10 identifies which channel or channels to record in activity 620. In activity 630, the identified channel(s) is recorded. Otherwise Unscheduled Event Detector and Stream Recorder 10 continues to monitor for unscheduled events.

In an alternative embodiment, similar to that which is described in relation to FIG. 7, a server 220 may be periodically or continuously queried over network 170 for the occurrence of an unscheduled event. A plurality of servers may be available, and therefore Unscheduled Event Detector and Stream Recorder 10 selects the proper server for query based on the nature of the unscheduled event and the programming stream to be recorded.

Alternatively, unscheduled events are monitored by subscribing to an RSS feed. Similar to that which is described in relation to FIG. 7, only instead of monitoring the unscheduled event stream channel, an RSS feed is monitored. Any such stream which may be received over network 170, satellite 180, or wirelessly by Unscheduled Event Detector and Stream Recorder 10 may be monitored in a similar fashion.

Figure 8:
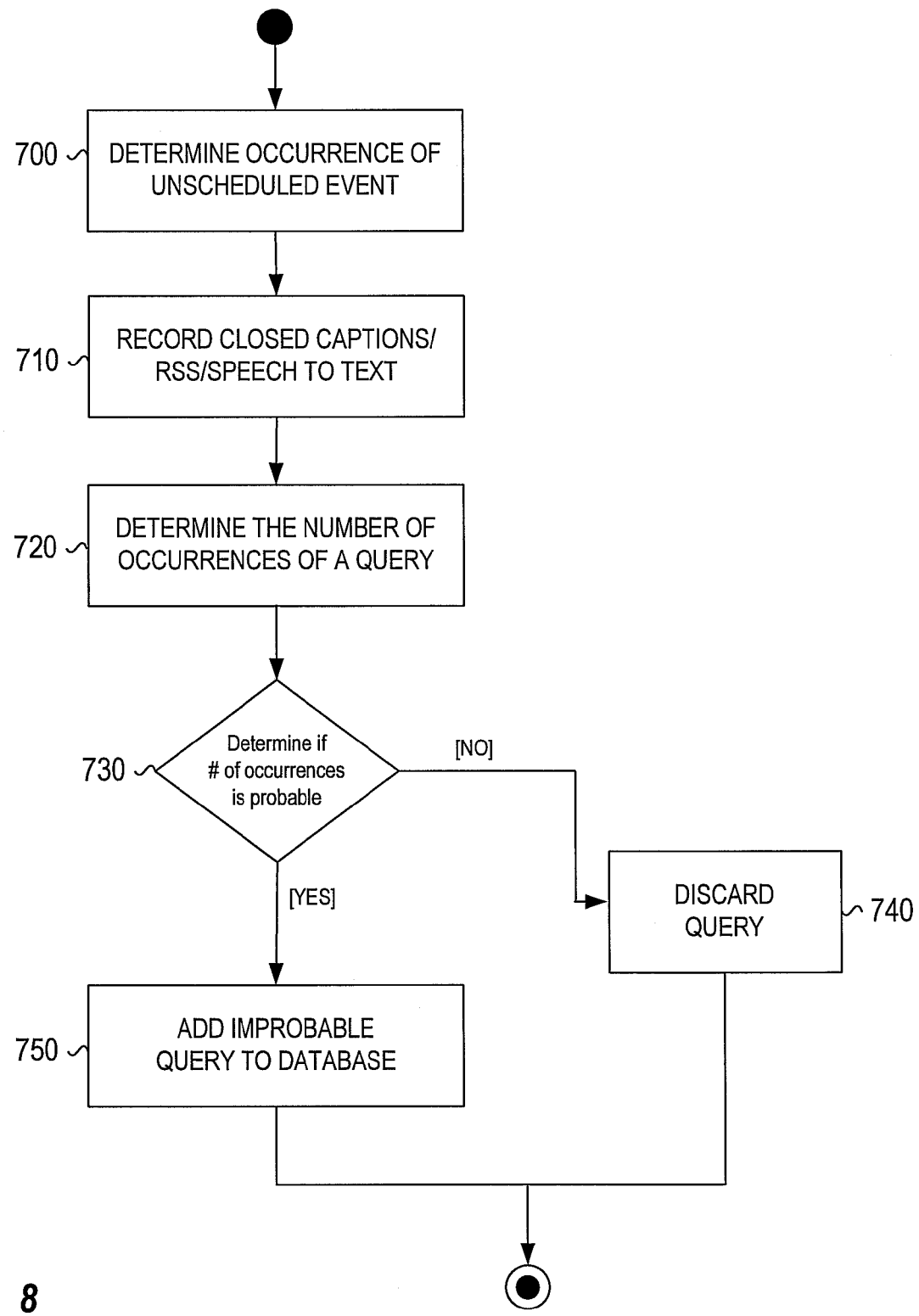
FIG. 8 is an activity diagram corresponding to updating a search query database based on the detection of an unscheduled event.

Referring to FIG. 8, in one embodiment updating the search query identification process identified in activity 360 is performed. The occurrence of an unscheduled event is detected in activity 700 according to one of the above described embodiments. In activity 710, the closed captioning information used to detect the unscheduled event and the buffered video immediately before, during and after the unscheduled event is recorded. The number of occurrences of a plurality of search strings in the captured closed captioning information is determined at activity 720. These search strings may be a single word or a combination of adjacent words. At decision point 730, if the number of occurrences is probable, then the search string is discarded in activity 740. If is the number of occurrences is improbable, then the search string is retained and added to a database containing search strings to monitor for a particular or type of unscheduled event in activity 750.

The probability of the occurrence of a string is developed over time by monitoring a statistically significant period of closed captioning data to determine the probability of occurrence of words and phrases. This may be constantly updated based on changes in programming stream content. It can be individualized for each programming stream to determine differences in programming streams. Particular words can be flagged as being important despite their frequent occurrence, such as Steve Colbert, President Bush, and Bono.

In one embodiment, newly added search strings are frequently tested for occurrence when an unscheduled event is detected. If the string is found not to occur again, then it may be eliminated from the search string database (e.g. it is treated as an anomalous occurrence.). Thus, the addition of many proper nouns which may be applicable only to a particular occurrence of an event is eliminated.

In addition to monitoring closed captioning information, the embodiments described can be modified to analyze data that is generated by speech-to-text processing. A speech-to-text processor located at headend 200, Unscheduled Event Detector and Stream Recorder 10, or elsewhere accessible via the network 170, such as server 220, processes the speech of the programming streams into text. This text may be analyzed as described above. Those skilled in the art will recognize that other sources of text stream data can be analyzed as well.

Figure 9:
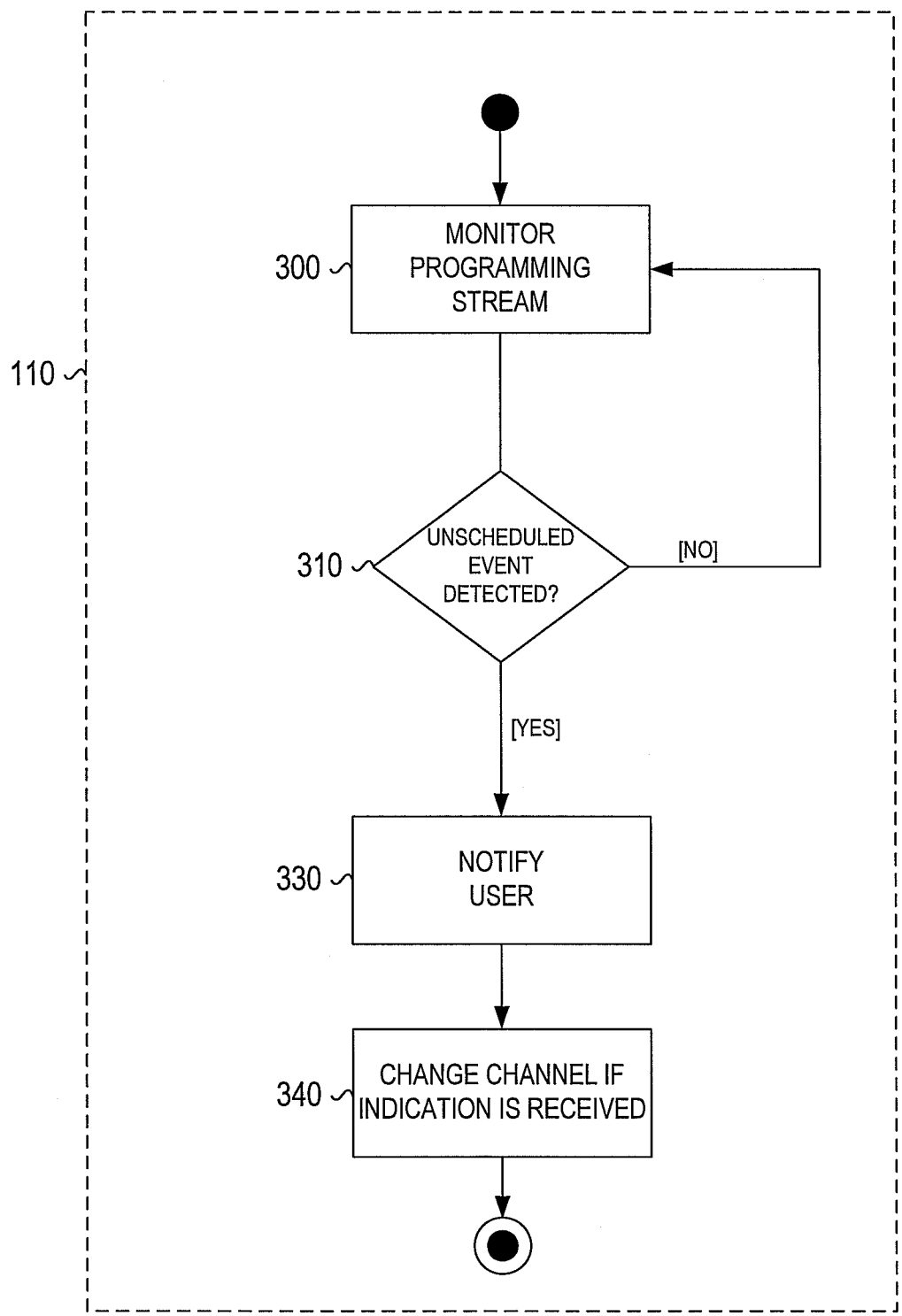
FIGS. 9 and 10 are activity diagrams corresponding to unscheduled event detection and notification.

Referring to FIG. 9, in an alternative embodiment, instead of recording a programming stream upon the occurrence of an unscheduled event, the user receives a notification that an unscheduled event has occurred and provided with a quick mechanism to change to the programming stream which carries programming related to the unscheduled event.

The process of determining search queries and monitoring programming streams functions in substantially the same way as any of the previously described embodiments in respect to FIGS. 2B-7. Therefore, in FIG. 9, activities 300 and 310 function as described above in respect to FIG. 2B. In activity 330 upon the detection of an unscheduled event, the user receives a notification that an unscheduled event has occurred. This notification may contain the channel that is carrying programming related to the unscheduled event. The notification includes a means for the user to quickly switch to the programming stream carrying programming related to the unscheduled event. In activity 340, if an indication is received from the user, Unscheduled Event Detector and Stream Recorder 10 causes a switch to the programming stream carrying programming related to the unscheduled event.

Figure 10:
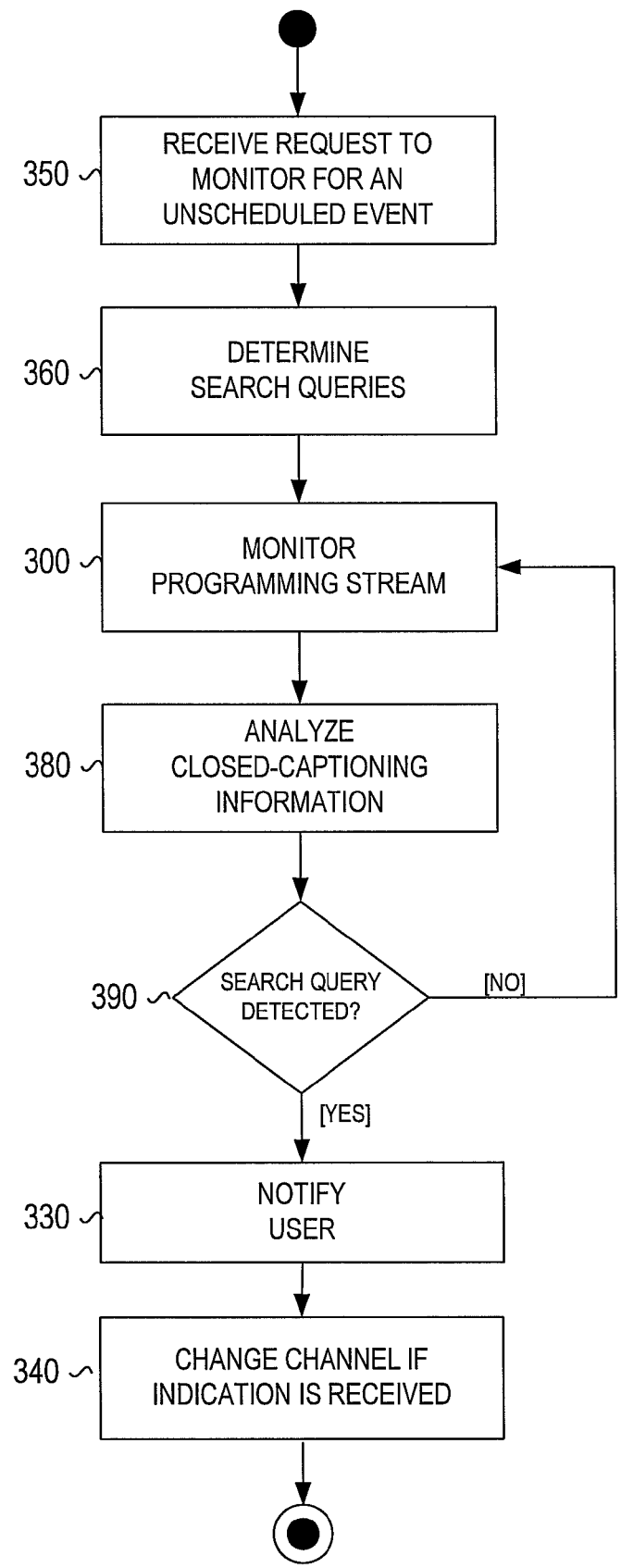

In FIG. 10, unscheduled event detection and notification may be implemented according to the previous implementations of Unscheduled Event Detection and Stream Recorder 10. Similar to the previously described FIG. 3, search queries are determined and closed captioning information is analyzed to determine unscheduled events. The embodiments depicted in FIGS. 2B-7 may be modified to implement notification, instead of recording the programming stream, notifying the user and enabling a quick channel change. In one embodiment, the channel is automatically changed upon the occurrence of an unscheduled event.

Furthermore, the triggering of recording and notification/channel change may be implemented together and may interact with each other. In one combined embodiment, upon detecting an unscheduled event, the programming stream is recorded and the user is notified and presented with a quick channel change option. The user may receive a pop-up stating that an unscheduled event has been detected, the programming stream is being recorded, and an opportunity to change channels. In another embodiment, the user upon detecting an unscheduled event, the user is notified and given the option to record or quickly change channels or both.

Figure 11:
FIG. 11 is a screen shot from a programming stream with a pop-up notification.

The notification the user receives may be a graphical component overlaid on the programming stream that the user is viewing. Such a graphical component is typically referred to as a window or a pop-up. FIG. 11 depicts a screen shot of the user display 800. The user display 800 contains programming content 810 and pop-up 820. Pop-up 820 includes a description of the unscheduled event that has occurred and instructions to the user for how to switch to the programming stream carrying the unscheduled event. In the case of a STB 160 and remote control, presently utilized remote controls typically have an enter button or an OK button which the user can actuate in response to pop-up 820. Alternatively, the indication may be delivered via a crawler or ticker or some other graphical notification.

The pop-up 820 may occur in an area where is obscures a portion of the programming content 810. In order to avoid such obstruction, the pop-up may be made small to lessen the chances of such obstruction. Additionally, motion detection and color area analysis may be used to detect optimal locations for the display of pop-ups in order to not interfere with programming content. In one embodiment, the pop-up will be located in a spatial area of the programming stream where there is little movement or non-changing similar colors (this area may have the additional requirement of being close to the edge of the display confines). Areas such as these are likely to be non-crucial areas to the programming stream.

The systems and methods described herein may be implemented in conjunction with present scheduled event notification and recording systems that allow users to schedule the recording of programs such as TiVo and other DVR or PVR systems.

The embodiments of the present invention may be implemented with any combination of hardware and/or software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

We claim:

1. A method of receiving a programming stream related to an unscheduled event, the method comprising:
    (a) monitoring, by a computer, a data stream, the data stream comprising at least a summary of closed caption information corresponding to a plurality of programming channels;
    (b) analyzing, by the computer, the closed captioning information contained in the data stream to determine an occurrence of an unscheduled event from the content of the closed captioning information;
    (c) in response to the determination of the occurrence of the unscheduled event, automatically utilizing the closed captioning information to identify a programming stream related to the unscheduled event; and
    (d) initiating receipt of the programming stream.

2. The method of claim 1, further comprising:
    (e) receiving a request to monitor the data stream for the unscheduled event; and
    (f) determining search strings associated with the unscheduled event, wherein, the analyzing of (b) includes analyzing the closed captioning information for the occurrence of the search strings.

3. The method of claim 2, further comprising:
    (g) displaying the programming stream in response to an activation of a single control.

4. The method of claim 3, wherein the single control is a button on a remote control.

5. The method of claim 4, wherein the button is the OK button.

6. The method of claim 4, wherein the button is the enter button.

7. The method of claim 2, wherein the determining of search strings, comprises:
    i) accessing a database containing search strings related to unscheduled events;
    ii) searching for the unscheduled event in the database;
    iii) retrieving matching search strings related to the unscheduled event;

iv) calculating error search strings, which represent likely errors in the typing of the closed captions;

v) combining the matching search strings and the error search strings;

vi) assigning the combined strings to the search strings.

8. The method of claim 1, wherein the programming stream is a programming stream received from a television channel.

9. The method of claim 1, wherein the programming stream is received via the Internet.

10. The method of claim 1, wherein information related to the programming stream is added to an RSS feed.

11. An alternate programming determination system comprising:

a processor for operating a plurality of software modules;

a monitoring module for monitoring a data stream, the data stream comprising at least a summary of closed caption information corresponding to a plurality of programming channels;

an evaluation module for analyzing the closed captioning information to determine an occurrence of an unscheduled event from the content of the closed captioning information;

a programming stream search module for automatically identifying, in response to the occurrence of the unscheduled event, a programming stream related to the unscheduled event by utilizing the closed captioning information; and a programming stream receiving module for receiving the programming stream.

12. The system of claim 11, wherein the evaluation module determines search strings associated with the unscheduled event, and wherein, the analyzing includes analyzing the closed captioning information for the occurrence of the search strings.

13. The system of claim 12, wherein the evaluation module determines search strings by accessing a database containing search strings related to unscheduled events, searching for the unscheduled event in the database, retrieving matching search strings related to the unscheduled event, calculating error search strings, which represent likely errors in the typing of the closed captions, combining the matching search strings and the error search strings and assigning the combined strings to the search strings.

14. The system of claim 11, wherein the programming stream is a programming stream received from a television channel.

15. The system of claim 11, wherein the programming stream is received via the Internet.

16. The system of claim 11, wherein information related to the programming stream is added to an RSS feed.

* * * * *